United States Patent [19]
Westergaard et al.

[11] Patent Number: 5,805,687
[45] Date of Patent: Sep. 8, 1998

[54] SUBSCRIBER EQUIPMENT MUTING METHOD AND APPARATUS

[75] Inventors: David Jeffrey Westergaard; Aaron James Bobick, both of Calgary, Canada

[73] Assignee: Northern Telecom Limited, Montreal, Canada

[21] Appl. No.: 723,321

[22] Filed: Sep. 30, 1996

[51] Int. Cl.⁶ .............................. H04M 1/64; H04M 3/20; H04M 3/22

[52] U.S. Cl. ........................ 379/215; 379/377; 379/381; 379/382; 379/164

[58] Field of Search .................................. 379/27, 29, 34, 379/162, 287, 299, 413, 127, 2, 30, 256, 102.01, 215, 142, 161, 163, 377, 381, 382, 393, 164

[56] References Cited

U.S. PATENT DOCUMENTS 5,263,084  11/1993  Chaput et al. .......................... 379/215

*Primary Examiner*—Ahmad F. Matar
*Assistant Examiner*—Charles N. Appiah
*Attorney, Agent, or Firm*—Foley & Lardner

[57] ABSTRACT

An apparatus for muting communications subscriber equipment connected to a communications line includes a monitoring circuit for monitoring electrical conditions of the communications line, when the subscriber equipment is connected thereto. A disconnection circuit is provided for disconnecting the subscriber equipment from the communication line and a termination circuit is provided for terminating the communications line with a dummy termination when the subscriber equipment is disconnected, such that, the communications line appears to be terminated by the subscriber equipment. When the subscriber equipment is disconnected from the communications line a power supply circuit provides power to the subscriber equipment with the same electrical conditions as determined by the monitoring circuit prior to disconnecting the subscriber equipment.

12 Claims, 5 Drawing Sheets

SUBSCRIBER EQUIPMENT MUTING METHOD AND APPARATUS

BACKGROUND OF THE INVENTION

This invention relates to subscriber telephone equipment which is used with Spontaneous Call Waiting Indication, Call Waiting Caller Identification and Off Hook Caller Identification features. Spontaneous Call Waiting Indication (SCWID) or Call Waiting Caller Identification, or Off Hook Caller Identification are methods of signalling to a subscriber, the identity of a call waiting, while the subscriber is off hook handling another call. When the subscriber is signalled, the subscriber can choose to address the call waiting by performing a hook flash or "link".

For SCWID features, a central office sends a Customer Alerting Signal (CAS) tone to the subscriber, while the subscriber is off hook, to indicate to the subscriber that a call is waiting. Subscribers equipped with call waiting detection equipment such as an adjunct, monitor the central office line for the CAS tone and upon detection, are required to send an acknowledgement tone to the central office whereupon the central office responds with Frequency Shift Keying (FSK) data indicative of the caller's identification. The adjunct then displays an indication of the identification of the waiting caller.

Telephone equipment standards require that SCWID equipped subscriber apparatus should be capable of muting signals from the user, while the apparatus sends the acknowledgement signal and while the FSK data is being sent from central office. An apparatus such as an adjunct device must be able to mute the transmission path from the host set to the central office line as well as mute the receive path from the central office to the subscriber equipment. This must be done at a tip/ring pair of the central office line. However, when the adjunct device mutes the transmit and receive paths to the host set, it must maintain a DC termination at the central office line interface and at the subscriber equipment interface. While the host set transmit and receive paths are muted, the adjunct must also maintain a transmit and receive path between the adjunct and the central office line to permit transmission of acknowledgment tones.

Conventional ways of handling SCWID calls with an adjunct in compliance with telephone equipment specifications cause the receive and transmit paths to be muted by disconnecting the subscriber equipment from the tip/ring pair and by providing a DC termination to the central office line. Disconnecting the subscriber equipment from the tip/ring pair removes the DC voltage from the subscriber equipment, which is equivalent to unplugging the subscriber equipment from the central office line. In some cases, subscriber equipment reacts to changes in tip/ring voltage and such disconnection of the subscriber equipment from the line may cause unpredictable operation. For example, some devices detect changes in tip/ring voltage and interpret such changes as indicative of extensions in use, or, some equipment may drop a call on hold, or, telephone answering devices may stop recording and drop a call. Thus, with present devices equipment with extension in use, hold and answering features cannot always be used with SCWID features. Therefore, it is desirable to provide an apparatus that will respond to SCWID features while at the same time comply with telephone system requirements to allow equipment with extension in use, hold and answering capabilities to be used in conjunction with SCWID features. The present invention addresses this need.

SUMMARY OF THE INVENTION

In accordance with one aspect of the invention, there is provided an apparatus for muting communications subscriber equipment connected to a communications line including a monitoring circuit for monitoring electrical conditions of the communications line, when the subscriber equipment is connected thereto. A disconnection circuit is provided for disconnecting the subscriber equipment from the communication line and a termination circuit is provided for terminating the communications line with a dummy termination when the subscriber equipment is disconnected, such that, the communications line appears to be terminated by the subscriber equipment. When the subscriber equipment is disconnected from the communications line a power supply circuit provides power to the subscriber equipment with the same electrical conditions as determined by the monitoring circuit prior to disconnecting the subscriber equipment.

Preferably, the monitoring circuit includes a measuring circuit for measuring the DC voltage across the communications line such that the power supply circuit provides to the subscriber equipment the same voltage as measured across the communications line. Preferably, the measuring circuit includes a sample and hold circuit connected to the communications line and the sample and hold circuit continuously monitors the communications line and produces a hold signal having a voltage approximately equal to the last measured voltage.

Preferably, the power supply circuit includes a buffer circuit connected to the sample and hold circuit for producing a buffered signal having a voltage proportional to the voltage of the hold signal and for controlling the voltage produced by the power supply circuit.

Preferably, the apparatus includes a status monitoring circuit for monitoring the status of the communications line to determine when the subscriber equipment is in use.

Preferably, the status monitoring circuit includes a current monitoring circuit for monitoring electric current flow in the communications line.

Preferably, the current monitoring circuit includes first and second current mirror circuits operable to provide first and second current sources at opposite polarities respectively, indicative of the current flowing in the line such that when the communications line has a first polarity, the first mirror circuit is operative and when the communications line has a second opposite polarity, the second mirror circuit is operative.

Preferably, the apparatus includes a current detect signal generator circuit for producing and rendering active a current detect signal in response to current supplied by the first or second mirror circuits.

Preferably, the apparatus includes a transmitter for transmitting on the communications line communications signals, and a superimposing circuit for superimposing the communications signals on the buffered signal to provide feedback to the subscriber equipment to indicate that the communications signals are being sent.

In accordance with another aspect of the invention, there is provided a method of muting communications subscriber equipment connected to a communications line, the method comprising the steps of:

a) monitoring electrical conditions of the communications line, when the subscriber equipment is connected to the line;

b) disconnecting the subscriber equipment from the communications line;

c) terminating the communications line with a dummy termination such that the communications line appears to be terminated by the subscriber equipment; and d) while the communications line is terminated by the dummy load, providing to the subscriber equipment the communications line electrical conditions as determined by the monitoring circuit prior to disconnecting the subscriber equipment from the communications line.

BRIEF DESCRIPTION OF THE DRAWINGS

In drawings which illustrate embodiments of the invention.

DETAILED DESCRIPTION

Referring to FIGS. 1, 2, 3 and 4, a schematic diagram of an apparatus according to a first embodiment of the invention is shown. In this embodiment, the apparatus forms part of an adjunct connected to a telephone to give a subscriber access to call identification features provided by a telephone company supplying telephone services to the subscriber. More particularly, the apparatus is used in a device operable to cooperate with spontaneous call waiting identification (SCWID) events wherein a central office sends a Customer Alerting Signal (CAS) tone to the subscriber and the subscriber acknowledges receipt of the CAS tone.

Generally, the apparatus functions to receive the CAS tone from the central office, mutes the subscriber equipment, sends an acknowledgement to the central office, receives frequency shift keyed (FSK) data regarding call waiting identification, un-mutes the subscriber equipment and then displays the identity of the call waiting on a display.

Figure 1:
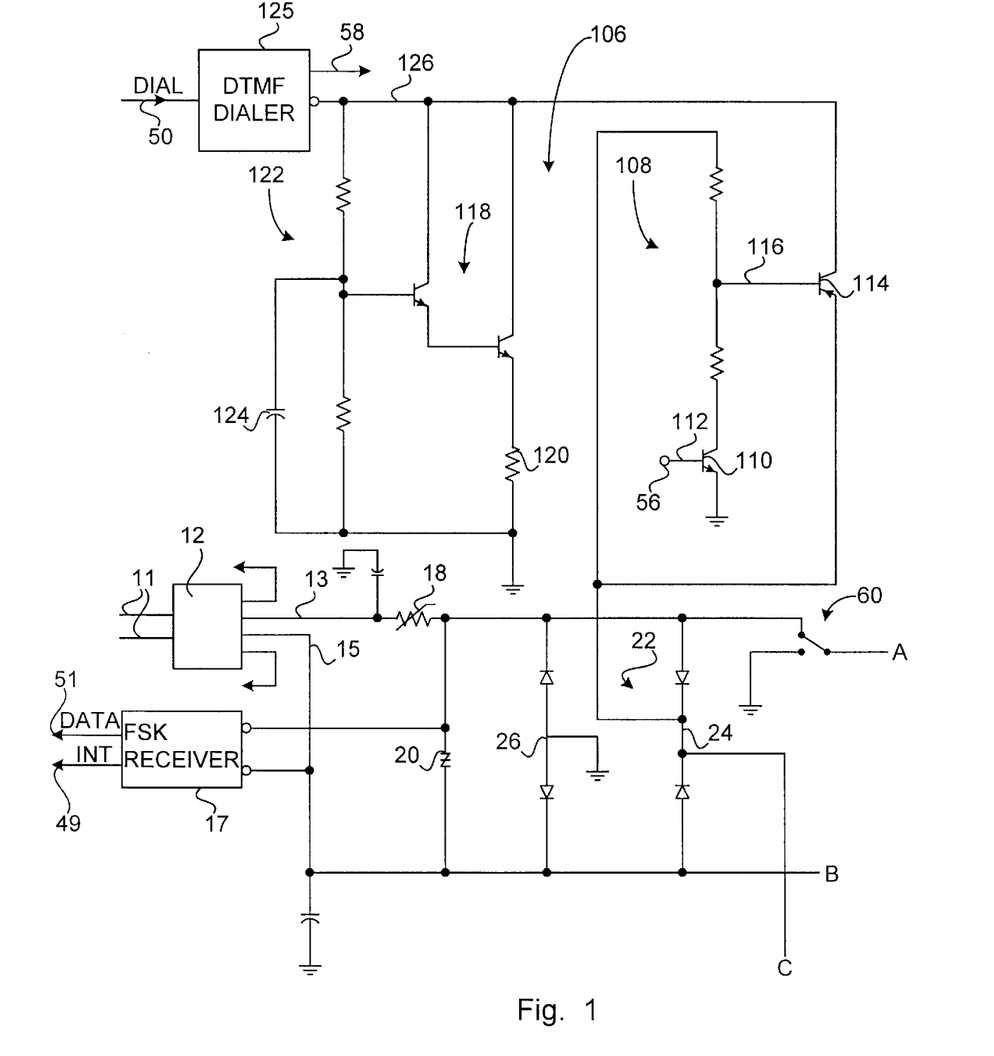
FIG. 1 is a first portion of a schematic diagram of a circuit according to a first embodiment of the invention.
Figure 2:
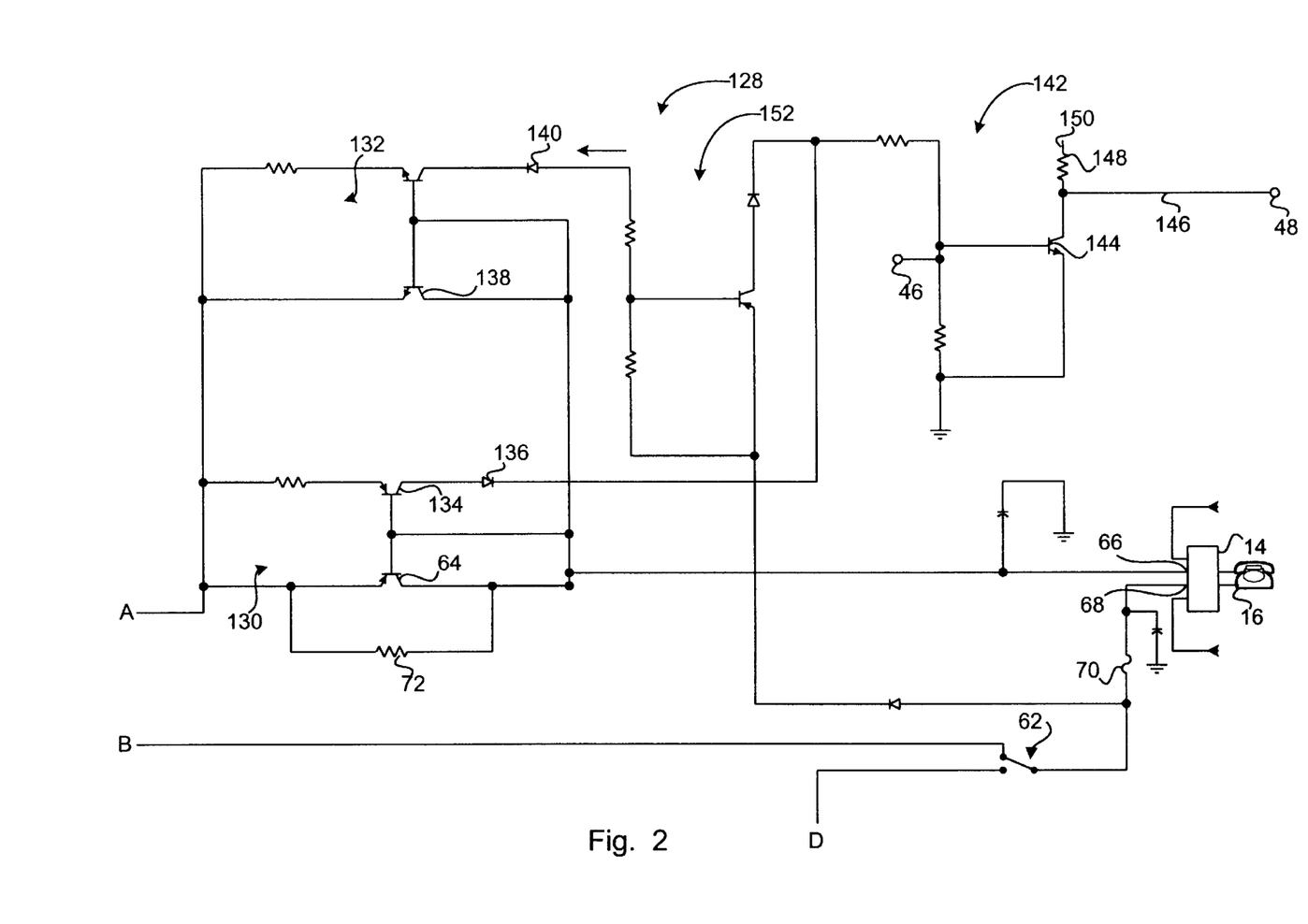
FIG. 2 is a schematic diagram of a second portion of the circuit according to the first embodiment of the invention.

Referring to FIGS. 1 and 2, the apparatus includes first and second telephone jacks 12 and 14, the first jack having tip and ring terminals 13 and 15 for receiving conventional tip and ring signals from the central office and the second jack for providing tip and ring signals to the subscriber equipment 16. The tip and ring terminals 13 and 15 are also connected to an FSK receiver 17 for detecting and decoding FSK signals received from the central office.

The tip and ring terminals 13 and 15 are further connected through a nonlinear resistor 18 and a transient absorber 20 to a full wave diode bridge, shown generally at 22. The diode bridge 22 has a live terminal 24 and a ground terminal 26. The diode bridge provides polarity reversal protection in the event that for some reason the tip and ring signals from the central office are reversed, perhaps due to faulty wiring at the user's premises. The live terminal 24 is therefore generally considered to be the effective TIP signal point and the signal ground connection 26 is considered to be the effective ring signal point.

Figure 3:
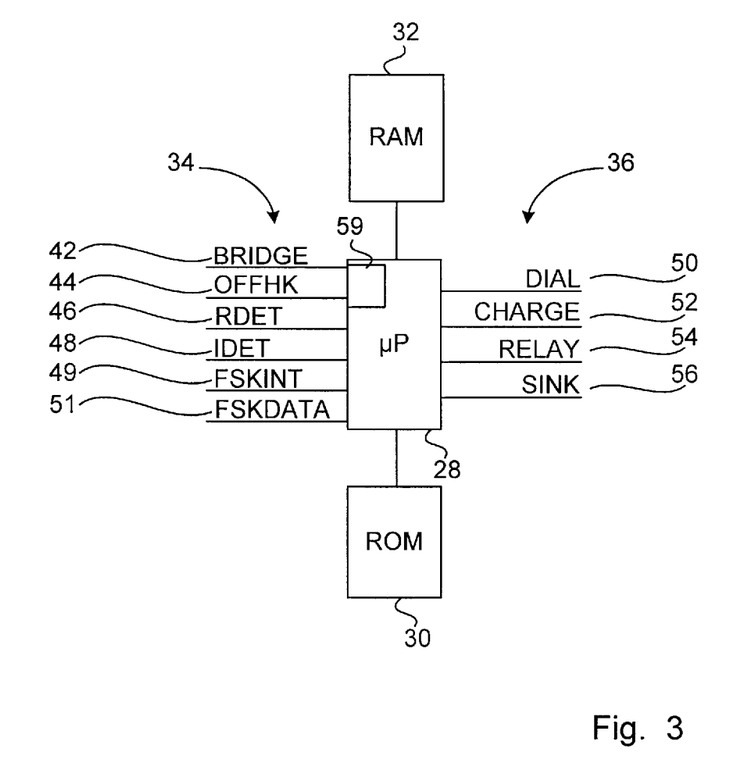
FIG. 3 is a schematic diagram of a third portion of the circuit according to the first embodiment of the invention.

Referring to FIG. 3, the apparatus includes a microprocessor circuit 28 connected in the usual manner to program memory 30 and random access memory (RAM) 32 and having a plurality of input terminals shown generally at 34 and output terminals shown generally at 36. The input terminals include a bridge terminal 42, an OFFHOOK terminal 44, and an RDET terminal 46 and a current detect, or IDET terminal 48 an FSK interrupt 49 and an FSK data terminal 51. The output terminals include a DIAL terminal 50, a CHARGE terminal 52, a relay terminal 54, and a SINK terminal 56. In this embodiment, the microprocessor has an internal, multiplexed A/D converter 59 for producing respective numbers indicative of voltages measured at the bridge terminal 42 and the OFFHOOK terminal 44.

It will be appreciated that the microprocessor is operable to monitor status of the input terminals 34 and is operable to render active any of the output terminals 36 in accordance with program modules stored in program memory 30.

Referring back to FIGS. 1 and 2, the apparatus further includes a relay identified as K1, having a first set of contacts 60 and a second set of contacts 62, which are simultaneously activated when the relay is energized. The contacts 60 and 62 are, of course, shown with the relay in the un-energized state, corresponding to the state where the subscriber equipment 16 is connected to the central office communication line 11. With the relay in the un-energized state, direct current for powering the subscriber equipment 16 is provided through the first set of contacts 60 and through a first transistor 64 to a TIP terminal 66 in the second telephone jack 14. The return path is provided through a ring terminal 68 in the second jack 14 through a first fuse 70, through the second set of contacts 62, and back to the ring terminal 15 of the communications line 11. It will be appreciated that first transistor 64 is operable to pass current only when the subscriber equipment is off hook and, therefore, a bypass resistor 72 is provided to allow on hook caller identification signals to flow to and from the subscriber equipment 16 from the communications line 11.

Monitoring Circuit

Figure 4:
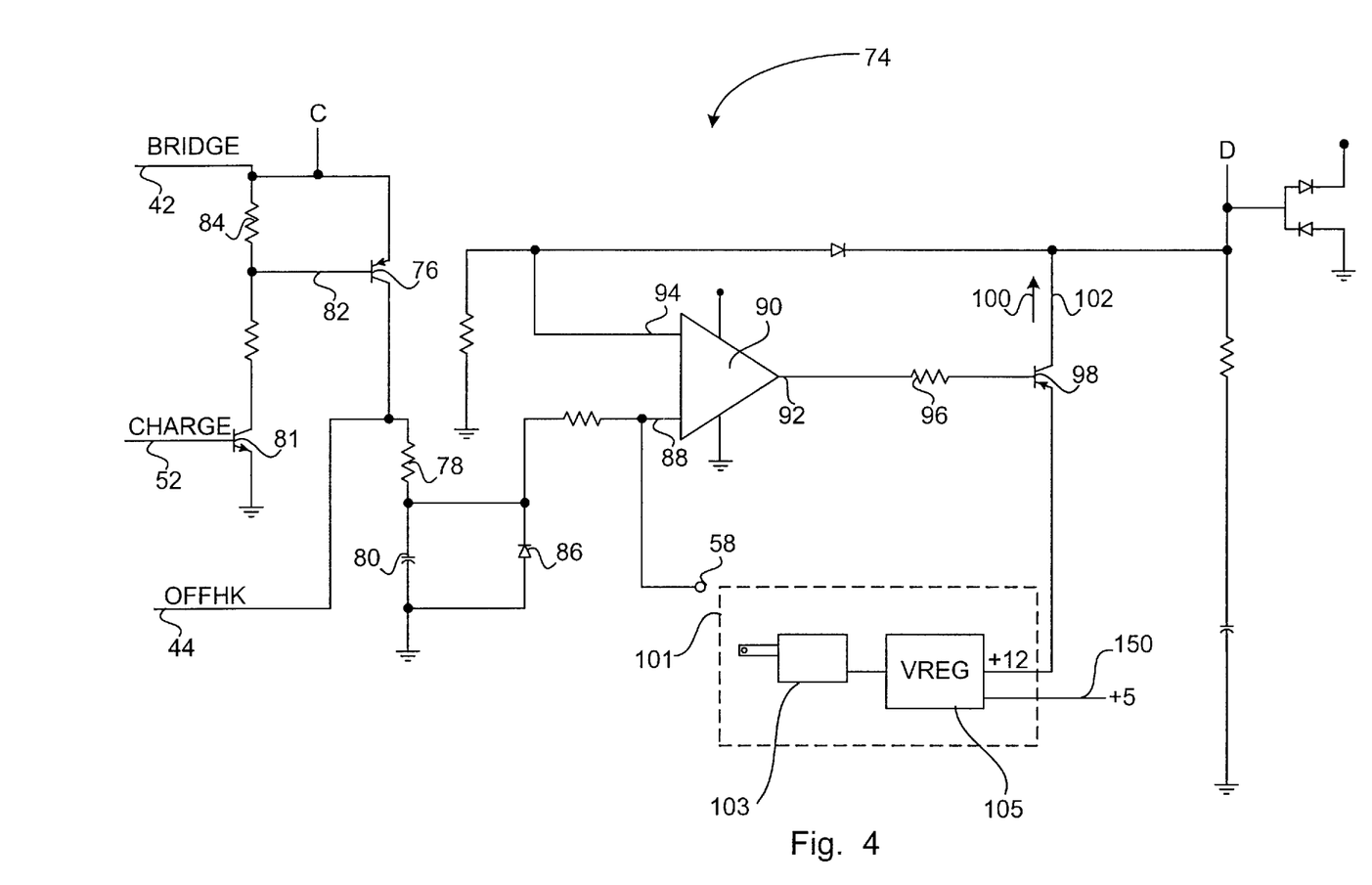
FIG. 4 is a schematic diagram of a fourth portion of the circuit according to the first embodiment of the invention.

Referring to FIGS. 1, 3 and 4, a monitoring circuit according to the first embodiment of the invention is shown generally at 74 and includes a second transistor 76, a resistor 78 and a storage capacitor 80. The operation of the second transistor is controlled by the microprocessor 28 upon activation of the CHARGE terminal 52, which turns on or off a third transistor 81 operable to sink current through a base connection 82 of the second transistor 76 or to pull high the base connection 82 through a resistor 84 connected to the live terminal 24. The live terminal 24 also supplies power to the second transistor 76 which, when turned on, allows current to pass through resistor 78 to charge capacitor 80. Thus, capacitor 80 develops a potential proportional to the potential or voltage at the live terminal 24. A zener diode 86, is connected in parallel across the capacitor 80 to limit the voltage across the capacitor to less than 10 volts. The transistor 76, resistor 78 and capacitor 80 under the control of the microprocessor 28 thus act as a sample and hold circuit connected to the communications line. While the charge terminal is active, the sample and hold circuit continuously monitors the communications line and while the charge terminal is inactive, the capacitor produces a hold signal having a voltage approximately equal to the last measured voltage.

Referring to FIG. 4, the voltage across the capacitor is provided to an inverting input 88 of an operational amplifier 90 having an output 92, which acts as a buffer circuit for producing a buffered signal proportional to the potential difference between a non-inverting input 94 of the operational amplifier and the inverting input 88 thereof, which is proportional to the voltage of the hold signal. The output 92 of the operational amplifier is connected through a resistor 96 to a fourth transistor 98 such that the voltage of the signal appearing at the output 92 controls the flow of current through the transistor 98 in the direction of arrow 100. The voltage appearing at a collector terminal 102 of the transistor 98 is fed back to the non-inverting input 94 such that the voltage appearing at the collector terminal is approximately equal to the voltage across the capacitor 80. Current is supplied to the operational amplifier 90 and to the transistor 98 by an external power supply 101, which includes a conventional AC power adapter 103 operable to supply 12 VDC at 1.0 Amps. A regulator 105 is provided to maintain the 12 VDC supply within tolerances.

Referring to FIGS. 2 and 4, the collector terminal 102 of the fourth transistor 98 is connected to the second set of contacts 62 such that when the relay K1 is energized, the collector 102 is connected through the fuse 70 to the ring terminal of the second telephone jack 14. Thus, when the relay K1 is energized, the fourth transistor 98 provides a signal at a voltage controlled by the voltage on capacitor 80, to the ring terminal 68 of the second telephone jack 14 and thereby provides a source of power to the subscriber equipment 16. The capacitor 80, operational amplifier 90, transistor 98, and power supply 101, thus act as a power supply circuit for providing to the subscriber equipment the communications line electrical conditions as determined by the monitoring circuit prior to disconnecting the subscriber equipment from the communications line, when the subscriber equipment is disconnected from the communications line.

Referring to FIGS. 1, 3, and 4, when the microprocessor 28 renders the CHARGE terminal 52 active, or to a high voltage level, the third transistor 81 is turned on whereby the second transistor 76 is turned on and the capacitor 80 is charged. Thus, the monitoring circuit 74 monitors the electrical conditions of the communications line, when the subscriber equipment is connected thereto. Conversely, when the microprocessor 28 renders the charge signal inactive, the third transistor 81 is turned off whereby the base connection 82 of the second transistor 76 is pulled high by resistor 84, which receives current from the live terminal 24. When the second transistor is turned off, no charge flows into the capacitor 80 and only a small leakage current flows out such that the voltage across the capacitor is generally maintained constant.

The monitoring circuit also provides a bridge signal to the bridge terminal 42 of the microprocessor 28, indicative of the voltage appearing at the live terminal 24.

Referring to FIGS. 1, 2, 3 and 4, it will be appreciated that when the subscriber equipment is on hook, a quiescent current flows through the nonlinear resistor 18 and through the diode bridge 22 to create a potential at the live terminal 24. When the second and third transistors 76 and 81 are turned on, a voltage proportional to this potential appears across the resistor 78 and capacitor 80, this voltage being presented to the OFFHOOK terminal 44 of the microprocessor 28. Thus, the microprocessor is operable to monitor the voltage, or at least a voltage proportional to the voltage, between the live terminal 24 and the ground terminal 26.

When an extension connected to the same line 11 goes off hook, current is drawn through the line which decreases the potential between the live terminal 24 and the ring terminal. This decrease in potential appears as a proportional decrease in potential across resistor 78 and appears as a decrease in potential at the OFFHOOK terminal 44. The microprocessor monitors the voltage at the OFFHOOK terminal 44 and detects this drop in potential, which is interpreted by the microprocessor as indicating that an extension is off hook.

Termination circuit

Referring to FIGS. 1 and 3, the apparatus further includes a termination circuit shown generally at 106. The termination circuit 106 is connected to the live terminal 24 through a voltage divider shown generally at 108 connected to a fifth transistor 110. The fifth transistor has a base terminal 112 which is connected to the SINK terminal 56 of the microprocessor 28 and is thus controlled by the microprocessor. When the SINK signal is active, or high, the fifth transistor 110 is turned on and current flows through the resistor divider 108 to control current flow through a sixth transistor 114 supplied with current from the live terminal 24.

To a collector terminal 116 of the sixth transistor 114, is connected a Darlington transistor configuration 118 including a load resistor 120, a voltage divider shown generally at 122 and a filter capacitor shown at 124, the combination of which produces a DC electrical load similar to that of the subscriber equipment or at least within telephone line termination specifications. When the sixth transistor 114 is turned on, current flows through the resistor divider 122 which biases the Darlington configuration 118 to present the load resistor 120 across the live terminal 24 and the ring terminal. Thus, when the microprocessor renders active the SINK signal, the Darlington configuration 118 and load resistor 120 are applied between the live terminal 24 and ground 26. Conversely, when the SINK signal is rendered inactive, the Darlington configuration 118 and load resistor 120 are disconnected from the live terminal 24. The Darlington configuration 118 and to a limited extent the resistor divider 122 and capacitor 124 thus act as a dummy termination when the subscriber equipment is disconnected such that the communications line appears to be terminated by the subscriber equipment.

The dummy termination provided by the resistor divider 108 and the fifth and sixth transistors 110 and 114 is also connected to a conventional DTMF dialler circuit 125 which provides DTMF dial signals on DIAL line 126, in response to dial codes presented at the DIAL terminal 50 by the microprocessor 28 under control of a dial routine (not shown). The DTMF DIAL tones pass through the sixth transistor 114 to the live terminal 24. Thus, when the termination switching circuit is rendered active, the microprocessor 28 may effectively DIAL out, to communicate with the central office over the communications line 11. The DTMF dialler 125 and transistor 114 under the control of the microprocessor 28 thus act as a transmitter for transmitting communication signals, in this case, DTMF DIAL tones on the communications line.

Referring to FIGS. 1, 2 and 3, the DIAL tones produced by the DTMF dialler are also provided to a HOSTDTMF terminal 58 connected to the operational amplifier 90 at the inverting input 88. The HOST DTMF signal is thus buffered by the operational amplifier 90 and when the relay is energized, the buffered HOST DTMF signal is passed to the subscriber equipment 16 through the ring terminal 68, to provide dialling feedback to the subscriber equipment 16. The connection of the DTMF dialler 125 to the operational amplifier 90 thus acts as a superimposing circuit for superimposing the communications signals on the buffered signal to provide feedback to the subscriber equipment to indicate that the communications signals are being sent.

Thus, when the microprocessor 28 is required to dial a telephone call, such as may be required in the event the user presses a button on a control panel requesting dialling of a pre-stored number for example, the microprocessor 28 energizes the relay terminal 54 to disconnect the subscriber equipment 16 from the communications line 11 and enables the SINK terminal 56 to connect the termination circuit 106 to the communications line through live terminal 24. The microprocessor 28 can then present dial instructions at the DIAL terminal 50 such that the DTMF dialler produces dial tones which are sent to the control office through the live terminal 24. The user receives audible feedback of such tones via the HOSTDTMF terminal 58 connected to the operational amplifier 90, relay contacts 62 and second telephone jack 14.

Status Monitoring Circuit

Referring to FIGS. 1 and 2, the apparatus further includes a status monitoring circuit shown generally at 128, which acts as a current monitoring circuit for monitoring electric current flow in the communications line 11. The current monitoring circuit includes first and second current mirror circuits shown generally at 130 and 132 respectively. The first current mirror circuit 130 is operational when the TIP terminal 13 is positive relative to the ring terminal 15 and the second current mirror circuit 130 is operational when the ring terminal 15 is rendered positive with respect to the TIP terminal 13. Thus, either the first or second current mirrors is operable, depending upon the polarity of the TIP and ring terminals 13 and 15.

Assuming the TIP terminal 13 is positive with respect to the ring terminal 15, the first current mirror circuit 130 passes current through transistor 64, to the subscriber equipment. A seventh transistor 134 acts as a current mirror and provides a current proportional to the current flowing through the first transistor 64, through a first diode 136. Thus, the current through the first diode 136 is proportional to the current flowing through transistor 64 and is therefore representative of the current flowing into the subscriber equipment 16.

Similarly, when the ring terminal 15 is positive with respect to the TIP terminal 13, current flows through an eighth transistor 138 of the second current mirror 132, which is reflected as a proportional current flowing through a second diode 140. The first and second current mirror circuits are thus operable to provide first and second current sources at opposite polarities respectively, proportional to or indicative of the current flowing in the line such that when the communications line has a first polarity, the first mirror circuit is operative and when the communications line has a second opposite polarity, the second mirror circuit is operative.

Referring to FIGS. 1, 2 and 3, current flowing through the first diode 136 is provided to a voltage divider network 142 having a connection to the RDET terminal 46 of the microprocessor 28. The microprocessor is thus operable to read a voltage output from the voltage divider network 142 proportional to the current flowing through the first diode 136. Thus, in effect, the voltage measured at the RDET terminal 46 is proportional to the current flowing into the subscriber equipment 16. The RDET signal appearing at the RDET terminal 46 is used to power a ninth transistor 144 connected as a switch and operable to provide a current detect signal IDET which is provided to the IDET terminal 48 of the microprocessor 28. When the voltage level of the RDET signal is sufficient to turn on the ninth transistor 144, the current detect signal 146 is rendered active, or low and conversely when the voltage of the RDET signal is insufficient to turn on the ninth transistor 144, the IDET signal 146 is rendered inactive, or high, due to its connection to a resistor 148 connected to a five volt supply terminal 150.

Referring to FIGS. 1 and 2, the second diode 140 is connected through a transistor inverter circuit 152 to the voltage divider 142 such that current flowing through the second diode 140 which is proportional to or indicative of the current flowing through the subscriber equipment 16 when the tip and ring terminals 13 and 15 are reversed, renders active the transistor inverter circuit 152 causing current to flow through the voltage divider 142 to function in the same way as described above.

When the subscriber equipment 16 is on hook, no current flows through the first transistor 64 or the eighth transistor 138 and therefore the RDET signal appearing at RDET terminal 46 is low and the ninth transistor 144 is turned off and the current detect signal 146 is rendered high or inactive. When the subscriber equipment 16 goes off hook, current flows through either the first transistor 64 or the eighth transistor 138, depending upon the polarity of the tip and ring terminals 13 and 15 and causes current to flow through the voltage divider network 142 which renders the RDET signal high, turning on the ninth transistor 144 and rendering the IDET signal 146 low or active. Thus, when the IDET signal 146 is low, the subscriber equipment 16 is considered to be off hook and when the current detect signal 146 is high, the subscriber equipment is considered to be on hook. The voltage divider 142 and inverter circuit 152 thus act as a current detect signal generator circuit for producing and rendering active a current detect signal in response to current supplied by the first or second mirror circuits.

Referring to FIGS. 1, 2 and 3, in addition, it will be appreciated that when a ringing signal is received on communications line 11, the ringing signal causes positive and negative voltage excursions across the tip and ring terminals at a predetermined frequency. These positive and negative excursions appear as corresponding pulses at the RDET terminal 46. Thus, when the microprocessor 28 receives a series of pulses, it is assumed that the subscriber equipment is ringing.

Operation

Referring to FIGS. 1, 2, 3 and 4, in operation, the relay K1 is initially un-energized and first and second contacts 60 and 62 are configured in the positions shown. In these positions, the normal tip and ring signals are provided directly to the subscriber equipment 16 through the first transistor 64 and the fuse 70. At the same time, the microprocessor 28 runs a routine (not shown) which maintains the CHARGE terminal 52 active whereby the second and third transistors 76 and 81 are turned on to supply current to capacitor 80 through resistor 78, thereby charging capacitor 80 to a voltage proportional to the voltage measured across the tip and ring terminals 13 and 15.

At the same time, assuming the microprocessor 28 is not dialling, the routine run by the microprocessor 28 maintains the SINK terminal 56 low, or inactive, whereby the fifth and sixth transistors 110 and 114 are turned off and the termination circuit 106 is not connected to the communications line 11.

Also, it is assumed that the central office is not sending a ringing signal to the subscriber equipment 16 and the subscriber equipment is not off hook and, therefore, no current flows through the first or eighth transistors 64 and 138 and, therefore, the ring detect signal is rendered low whereby the ninth transistor 144 is turned off and the current detect signal 146 is high, or inactive.

Upon receiving a ringing signal from the central office, with each positive or negative excursion of the ringing signal, current alternately flows through the first transistor 64 and the eighth transistor 138 causing pulses of current to flow through the voltage divider network 142 to produce a pulsed ring detect signal at the RDET terminal 46 and a pulsed current detect signal 146 opposite in polarity to the ring detect signal. The routine run by the microprocessor 28 causes the microprocessor 28 to detect the pulses and determines that the central office is sending a ringing signal and takes whatever action has been programmed in the routine, such as call answering, etc.

Assuming that, in response to the ringing signal, the subscriber takes the equipment 16 off hook, the ringing signal is terminated by the central office and assuming the polarity of the tip and ring terminals is positive, normal subscriber loop current flows through the first transistor 64 to power the subscriber equipment 16. This current is mirrored through the seventh transistor 134 which supplies current to the voltage divider 142, turning on the ninth transistor 144 and providing an active low signal to the IDET terminal 48. The routine run by the microprocessor 28 causes the microprocessor to interpret this active low IDET signal as indicating the subscriber equipment is off hook.

Now, assuming the central office wishes to notify the subscriber of a call waiting, the central office provides a Customer Altering Signal (CAS) tone, which is received and detected at the FSK receiver 17. The FSK receiver interrupts the microprocessor 28 with the interrupt signal 49 and invokes a receive routine, shown generally at 154 in FIG. 5. This routine includes a first block 156 which directs the microprocessor to monitor the interrupt signal 49 to determine whether or not it remains active for at least 80 mSec. If it does not, the routine is aborted. If it remains active for the required time, block 158 directs the microprocessor to measure the offhook voltage at the OFFHOOK terminal and compare it to a reference offhook voltage previously measured, to determine if the presently measured voltage is less than the reference voltage. If so, then it is assumed that an extension is in use and the routine is aborted. If not, a muting block 160 directs the microprocessor to energize relay K1, set the SINK signal active and set the CHARGE signal inactive.

Referring to FIGS. 1, 2, 3 and 4, the energizing of the relay K1 disconnects or "mutes" the subscriber equipment 16 from the communications line 11. Thus, the microprocessor and relay K1 act as a disconnection circuit for disconnecting the subscriber equipment from the communications line. At the same time, the activation of the SINK signal 56 connects the dummy load between the live terminal 24 and the ring terminal 15. Thus, to the central office, the line appears to be terminated by the subscriber equipment 16.

At the same time, with the deactivation of the charge signal at the CHARGE terminal 52, the second and third transistors 76 and 81 are shut off and are rendered to high impedance whereby the voltage across the capacitor 80 before the second and third transistors were shut off, is maintained on capacitor 80 to supply a relatively constant voltage to the inverting input 88 of the operational amplifier. The operational amplifier 90 thus presents a constant voltage at output 92, proportional to the voltage across the capacitor 80, to the fourth transistor 98 which presents a voltage identical to that measured across the tip and ring terminals to the ring terminal 68 of the subscriber equipment. This current is supplied by the power supply 101.

Thus, the subscriber equipment is supplied with a voltage identical to that which was supplied prior to the termination circuit 106 being connected to the communications line 11.

With the communications line 11 terminated by the termination 106 and the subscriber equipment 16 supplied with power by the power supply 107, the subscriber equipment 16 sees essentially the same voltage supply conditions that existed on the line before the CAS tone was received. Thus, while the subscriber equipment 16 has been disconnected from the communications line 11, it is presented with the same electrical conditions as the line, which causes it to appear to still be connected to the line. Thus, certain hold functions and answering machine functions as found on some subscriber equipment and which monitor interruptions in line power supply to effect certain functionality, will not falsely invoke such functionality when the subscriber equipment is disconnected from the line.

The transistor 76, resistor 78 and capacitor 80 thus act as a measuring circuit for measuring the voltage across the communications line such that the power supply circuit provides to the subscriber equipment the same voltage as measured across the communications line.

Figure 5:
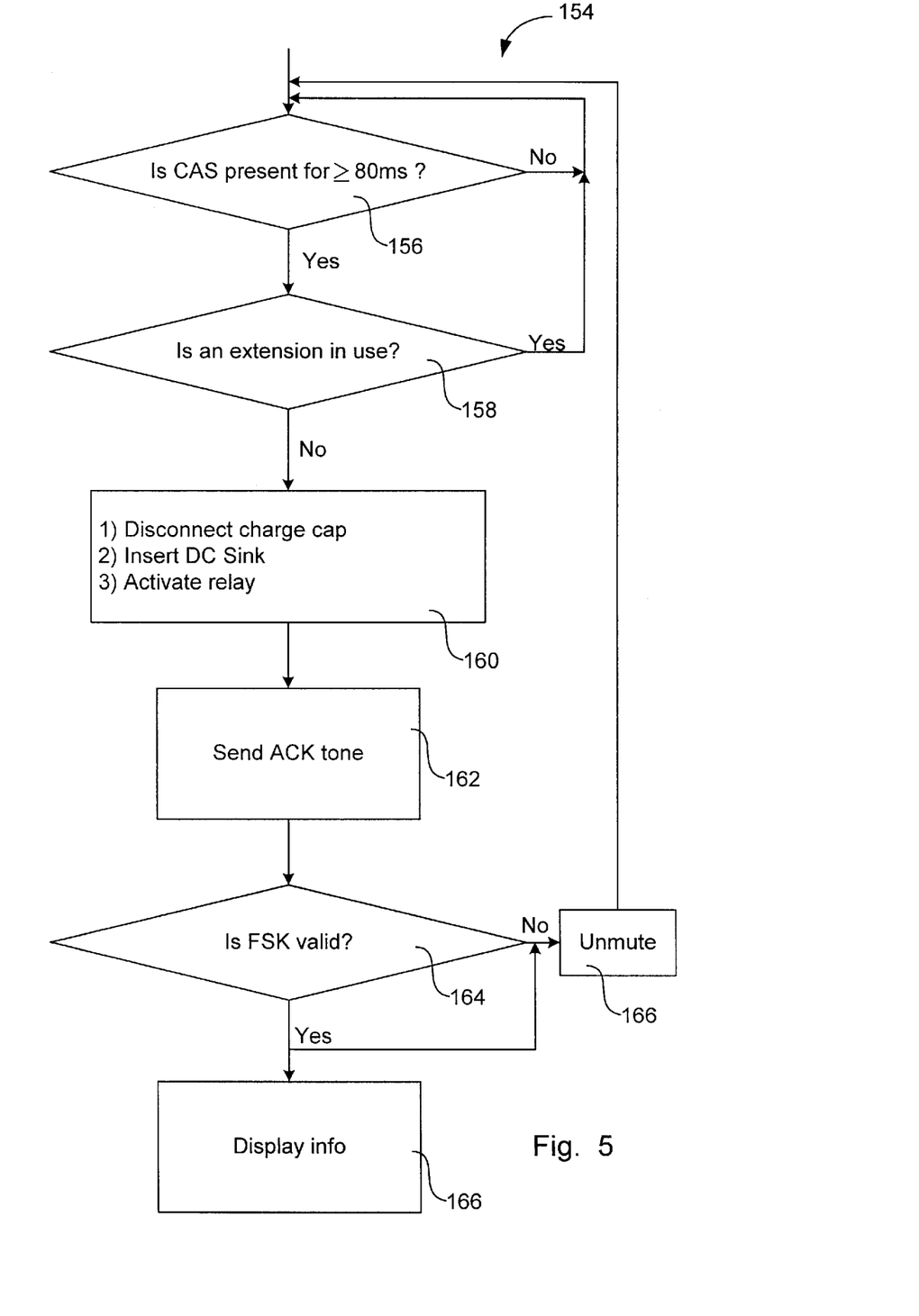
FIG. 5 is a flow diagram of a data handling algorithm according to the first embodiment of the invention.

The line is thus terminated and muted from the subscriber equipment and the subscriber equipment is powered by the power supply. With the subscriber equipment muted, block 162 directs the microprocessor to activate the DTMF dialler 125 to send the DTMF tone for the letter "D" as an ACK signal. The DTMF dialler presents a dial signal through the sixth transistor 114 to the line to provide the acknowledgement signal to the central office. The transmission of this acknowledgement signal is fed back to the HOSTDTMF terminal 58 to provide feedback of the ACK signal to the subscriber equipment.

The central office responds with FSK data which is received at the FSK receiver 17. Block 164 directs the microprocessor 28 to read data from the FSK receiver 17 and determine whether or not the data is valid according to a cyclic redundancy check. If the data is valid, block 166 directs the microprocessor to display the awaiting caller's identification on a display.

If the data is not valid, block 168 directs the microprocessor to de-energize the relay K1 and reconnect the subscriber equipment directly to the tip and ring terminals 13 and 15 through contacts 60 and 62, deactivate the SINK terminal 56 to shut off the fifth and sixth transistors 110 and 114, thereby removing the termination circuit 106 from the communications line 11 and at the same time render active the CHARGE terminal 52 to reconnect the capacitor 80 so that it may be recharged to a voltage, again proportional to the voltage across the tip and ring terminals 13 and 15.

In effect, while the subscriber equipment 16 is muted from the communications line 11, the communications line 11 is terminated as though it were terminated by the subscriber equipment 16. Thus, to the central office, the electrical conditions appear the same as though the subscriber equipment 16 were connected to the communications line 11. Thus, loading on the communications line 11 is unchanged. In addition, while the subscriber equipment 16 is muted, the tip and ring voltage at the subscriber equipment is maintained at the same value that was present before the subscriber equipment was muted. Thus, to the subscriber equipment, the power supply "appears" to be the central office.

Tip and ring polarity reversals provided by the central office are still passed to the subscriber equipment when the equipment is not muted. In addition, while the subscriber equipment is muted and adjunct equipment is dialling, DTMF tones generated by the adjunct are sent to the central office and are simultaneously provided to the subscriber equipment to provide audible feedback to allow the user to detect when the adjunct is dialling.

While specific embodiments of the invention have been described and illustrated, such embodiments should be considered illustrative of the invention only and not as limiting the invention as construed in accordance with the accompanying claims.

What is claimed is:

1. An apparatus for muting communications subscriber equipment connected to a communications line, the apparatus including:

a) a monitoring circuit for monitoring electrical conditions of said communications line, when said subscriber equipment is connected to said communication line;

b) a disconnection circuit for disconnecting said subscriber equipment from said communication line;

c) a termination circuit for terminating said communications line with a dummy termination when said subscriber equipment is disconnected, such that, said communications line appears to be terminated by said subscriber equipment;

d) a power supply circuit for providing to said subscriber equipment said communications line electrical conditions as determined by said monitoring circuit prior to disconnecting said subscriber equipment from said communications line, when said subscriber equipment is disconnected from said communications line.

2. An apparatus as claimed in claim 1 wherein said monitoring circuit includes a measuring circuit for measuring the voltage across said communications line such that said power supply circuit provides to said subscriber equipment the same voltage as measured across said communications line.

3. An apparatus as claimed in claim 2 wherein said measuring circuit includes a sample and hold circuit connected to said communications line.

4. An apparatus as claimed in claim 3 wherein said sample and hold circuit continuously monitors said communications line and wherein said sample and hold circuit produces a hold signal having a voltage approximately equal to the last measured voltage.

5. An apparatus as claimed in claim 4 wherein said power supply circuit includes a buffer circuit connected to said sample and hold circuit for producing a buffered signal having a voltage proportional to the voltage of said hold signal and for controlling the voltage produced by the power supply circuit.

6. An apparatus as claimed in claim 5 further including a transmitter for transmitting on said communications line communications signals, and a superimposing circuit for superimposing said communications signals on said buffered signal to provide feedback to said subscriber equipment to indicate that said communications signals are being sent.

7. A method of muting communications subscriber equipment connected to a communications line, the method comprising the steps of:

a) monitoring electrical conditions of said communications line, when said subscriber equipment is connected to said communications line;

b) disconnecting said subscriber equipment from said communications line;

c) terminating said communications line with a dummy termination such that said communications line appears to be terminated by said subscriber equipment; and d) while said communications line is terminated by said dummy load, providing to said subscriber equipment said communications line electrical conditions as determined by said monitoring circuit prior to disconnecting said subscriber equipment from said communications line.

8. A method as claimed in claim 7 wherein the step of monitoring includes the step of measuring the voltage across said communications line and wherein the step of providing includes the step of providing to said subscriber equipment the same voltage as measured across said communications line.

9. A method as claimed in claim 8 wherein the step of measuring the voltage includes the step of connecting a sample and hold circuit to said communications line.

10. A method as claimed in claim 9 wherein said sample and hold circuit continuously monitors said communications line and wherein said sample and hold circuit produces a hold signal having a voltage approximately equal to the last measured voltage.

11. A method as claimed in claim 10 wherein the step of providing to said subscriber equipment includes supplying said hold signal to a buffer to produce a buffered signal having a voltage proportional to the voltage of said hold signal and controlling the voltage produced by the power supply circuit.

12. A method as claimed in claim 11 further including the step of transmitting on said communications line communications signals and superimposing said communications signals on said buffered signal to provide feedback to said subscriber equipment to indicate that said communications signals are being sent.

* * * * *